United States Patent

Wickenheiser

[11] Patent Number: 5,941,567
[45] Date of Patent: Aug. 24, 1999

[54] HEAD IMPACT PROTECTION FOR AN AUTOMOBILE SEAT BELT ANCHOR FASTENER

[75] Inventor: Francis J. Wickenheiser, Monroe, Mich.

[73] Assignee: Ford Global Technologies, Inc., Dearborn, Mich.

[21] Appl. No.: 08/788,096

[22] Filed: Jan. 23, 1997

[51] Int. Cl.⁶ .................................................. B60R 22/00
[52] U.S. Cl. ...................... 280/808; 280/751; 280/801.1
[58] Field of Search ............................ 280/801.1, 801.2, 280/808, 751

[56] References Cited

U.S. PATENT DOCUMENTS

| | | | |
|---|---|---|---|
| 3,885,492 | 5/1975 | Gutshall | 411/373 |
| 3,969,786 | 7/1976 | Peak | 411/373 |
| 4,642,853 | 2/1987 | Plesniarski | 280/804 |
| 4,955,639 | 9/1990 | Yamamoto | 280/808 |
| 5,096,224 | 3/1992 | Murakami et al. | 280/808 |
| 5,207,489 | 5/1993 | Miller | 305/56 |
| 5,529,344 | 6/1996 | Yasui et al. | 280/808 |
| 5,685,566 | 11/1997 | Hirase et al. | 280/801.1 |
| 5,746,449 | 5/1998 | Hiroshige | 280/808 |

FOREIGN PATENT DOCUMENTS 1111907   9/1984   Russian Federation .

*Primary Examiner*—J. Woodrow Eldred
*Attorney, Agent, or Firm*—David B. Kelley

[57] ABSTRACT

A fastener bolt for an automobile seat belt anchor is provided with an annular energy-absorbing cushion on the front surface of the bolt head. In a crash situation, forcible movement of a vehicle occupant's head against the cushion will have a lessened tendency to cause human injury or pain. The annular cushion has a central access opening that registers with a non-circular cavity in the bolt head, such that the fastener bolt can be screwed into a hidden fastener nut while the cushion is in place on the bolt.

4 Claims, 2 Drawing Sheets

HEAD IMPACT PROTECTION FOR AN AUTOMOBILE SEAT BELT ANCHOR FASTENER

BACKGROUND OF THE INVENTION

1. Field of the Invention

This invention relates to a cushioned fastener, and particularly to a fastener for an automobile seat belt anchor. The head of the fastener has a cushion means on its front surface designed to absorb energy should a person happen to strike his head against the fastener, thereby lessening the injurious effect that might result.

2. U.S. Pat. No. 4,642,853 discloses a seat belt anchor that includes a threaded fastener having a resin covering designed to minimize injury to a person who might forcibly contact the fastener or other exposed surface of the anchor. Since the head of the fastener is resin-covered, the fastener cannot be rotated to tighten the fastener on the anchor; instead a nut has to be applied to the threaded end of the fastener to secure the seat belt anchor.

U.S. Pat. No. 4,955,639 discloses a seat belt anchor having a two piece hinged cover that includes a base adapted to underlie the head of a fastener bolt, and a hollow cap structure adapted to be swing to a position encircling the bolt head. The cover has to be prepositioned on the mounting surface when the fastener bolt is to be threaded into the mounting surface.

Russian Patent 1,111,907 shows a seat belt anchor having a decorative dome adapted to overlie the head of a fastener bolt.

SUMMARY OF THE PRESENT INVENTION

The present invention relates to a fastener bolt having a self-contained cushion member on the front surface of the bolt head. A central opening in the cushioning member provides access to a non-circular cavity in the front surface of the bolt head, whereby a turning implement can be applied to the cavity to screw the fastener bolt into a threaded hole in a mounting surface. The cushion member can be incorporated into the bolt at the bolt manufacturing facility, so that the cushioned fastener bolt can be handled as a single unit at the manufacturing facility where the fastener bolt is to be used. A principal use of the cushioned fastener bolt is the fastening of a seat belt anchor in an automobile.

The access opening in the cushioning member enables a turning implement to be applied to the fastener bolt when the space behind the anchor mounting surface is hidden and non-accessible. The seat belt anchor can be installed when the automobile interior is in a substantially finished condition. The seat belt anchor does not have to be installed prior to final assembly of the automobile, i.e. prior to closing the pillar on which the seat belt anchor is to be mounted.

In preferred practice of the invention, the cushioning member on the head of the fastener bolt comprises a hollow annular resilient sheet having a curved convex toroidal front (outer) surface and a curved concave toroidal rear (inner) surface. The hollow toroidal construction of the cushioning member provides an annular vacant space that can accommodate front-to-rear deformation of the sheet associated with a person's head impacting the cushioning member. The cushioning member is designed to absorb a substantial amount of energy so as to substantially lessen the potential injury that a person might suffer as a result of striking the cushioning member.

Further advantages of the invention will be apparent from the attached drawings and description of a preferred embodiment of the invention.

DESCRIPTION OF A PREFERRED EMBODIMENT OF THE INVENTION

Figure 2:
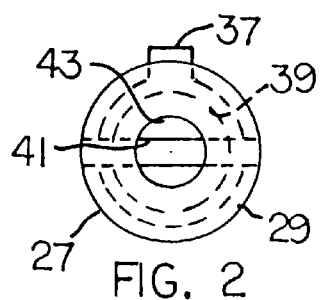
FIG. 2 is a front view of the FIG. 1 fastener bolt.
Figure 1:
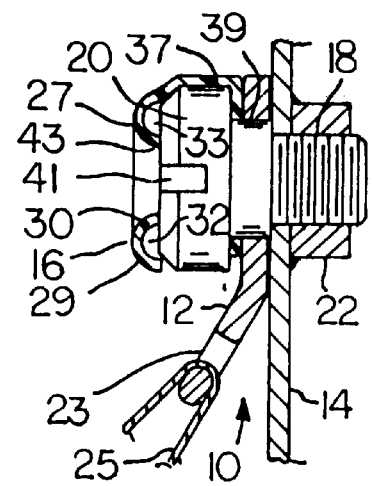
FIG. 1 is a sectional view of a fastener bolt and seat belt anchor utilizing the invention.
Figure 3:
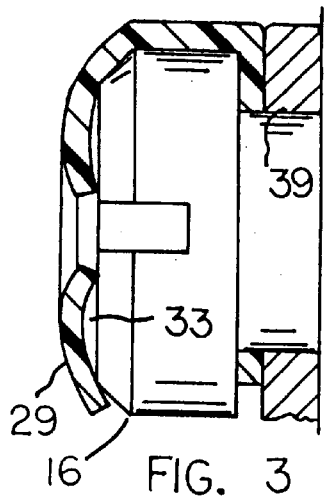
FIG. 3 is a fragmentary sectional view taken in the same direction as FIG. 1, but showing a cushioning member on the bolt head in a deformed condition.

FIGS. 1 through 3 show an automotive seat belt anchorage 10 that comprises a flat belt-anchor element 12 positioned against an exposed surface of an automobile interior wall 14. Wall 14 can be a pillar that helps to define a door opening. Seat belt anchorage 10 would be located at approximately the same elevation as the head of a person sitting in the automobile.

During normal operation of the automobile the person's head will be spaced about seven inches from seat belt anchorage 10. However, in a crash situation there is a possibility that the person's head could forcibly impact the seat belt anchor 12 or the fastener bolt that is used to fasten the anchor to the interior wall 14. The present invention is concerned with a cushioned fastener 16 designed to absorb some of the energy associated with such forcible impact, whereby the extent of human energy or trauma is lessened to some degree.

Fastener 16 comprises a steel fastener bolt having a threaded shank 18 and an enlarged head 20. The shank is adapted to screw into a nut 22 welded, or otherwise secured, to the hidden (non-accessible) surface of wall 14, whereby anchor element 12 is fastened to the automobile. Anchor element 12 can be a known plate-like structure having a guide slot 23 for the seat belt 25.

The invention is more particularly concerned with an energy-absorbing cushion 27 located on the front surface of bolt head 20. As shown in FIGS. 1 through 3, the cushion comprises an annular resilient sheet member 29 molded, or otherwise formed, into a hollow annulus so that the front surface 30 of the sheet has a curved convex cross section, and the rear surface 32 of the sheet has a curved concave cross section. The sheet has a hollow three dimensional toroidal construction that provides an annular vacant space 33 proximate to the front surface of the bolt head 20.

Sheet 29 can be metal or plastic. When the sheet is plastic it will be molded to the hollow three dimensional toroidal configuration. When the sheet is metal it will be stamped and heat treated to a resilient deformable condition having a memory. The plastic or metal sheet 29 will be resilient and deformable so as to normally have the configuration depicted in FIGS. 1 and 2.

The resilient deformable sheet can be attached to the fastener bolt in various different ways. As shown in FIGS. 1 and 2, the toroidal sheet is retained on the bolt by an integral arm structure 37 that runs along the side surface of bolt head 20 and then flatwise along the rear surface of the bolt head, as shown in FIG. 1. A circular opening 39 can be formed in the arm structure to encircle the bolt shank and thus prevent the cushion member from inadvertent separation from the bolt, particularly during shipping or handling prior to the operation of screwing the bolt into nut 22.

The front surface of the bolt head 20 has a slot-type cavity 41 adapted to receive a turning implement (e.g. a flat blade screw driver), whereby the bolt can be screwed into nut 22 without removing cushion 27. The toroidal construction of the cushion forms a central access opening 43 that registers with the turning cavity 41, such that a turning implement can be extended through opening 43 into the non-circular cavity 41.

During a crash impact situation (e.g. a person's head forcibly striking cushion 27) the resilient deformable sheet 29 can temporarily deform from the FIG. 1 condition toward the FIG. 3 flattened condition. In the process the cushion (sheet) absorbs kinetic energy to minimize any injury or pain that the person might suffer. Vacant space 33 behind the deformable sheet 29 accommodates the deformed sheet material. Preferably the material for sheet 29 will have sufficient resilience that the sheet will return to the FIG. 1 condition after the crash event.

Figure 5:
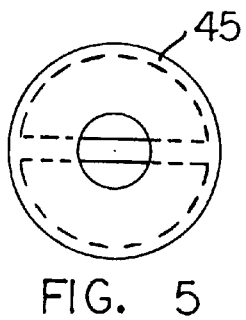
FIG. 5 is a front view of the FIG. 4 fastener bolt.
Figure 4:
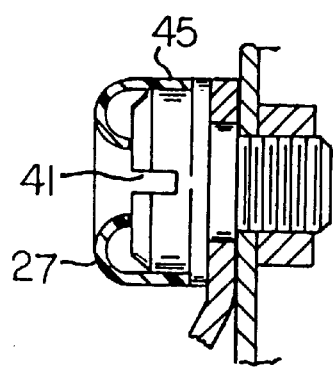
FIG. 4 is a sectional view taken through another fastener bolt and seat belt anchor embodying the invention.

As noted above, the cushion can be attached to the bolt in various different ways. FIGS. 4 and 5 shows an arrangement wherein the cushion is retained on the bolt head by an integral tubular wall 45 telescoped onto the side surface of the bolt head.

Figure 8:
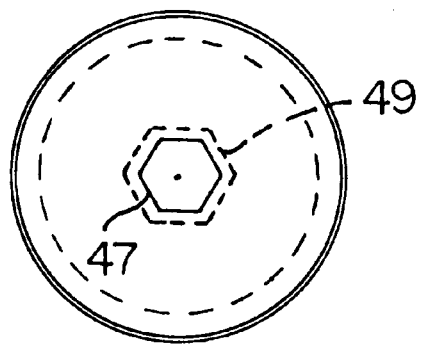
FIG. 8 is a front view of the FIG. 7 fastener bolt.
Figure 7:
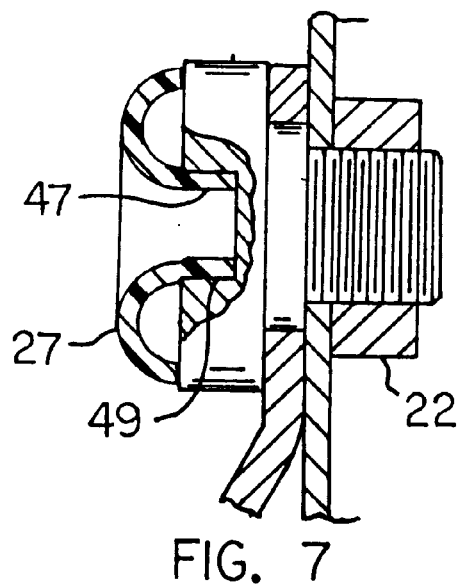
FIG. 7 is a sectional view taken through another fastener bolt built according to the invention.

FIGS. 7 and 8 show an alternate retainer arrangement wherein the cushion has a central non-circular hollow mounting plug 47 adapted to fit into a mating non-circular socket 49 in the bolt head. With this arrangement the hollow mounting plug provides the cavity that is used for screwing the bolt into the concealed nut 22.

Figure 6:
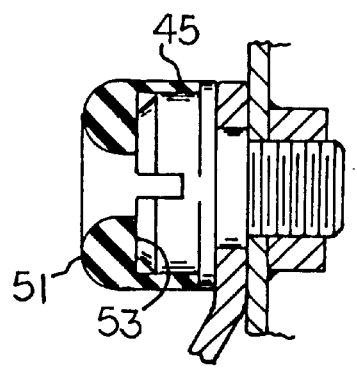
FIG. 6 is a sectional view taken through an additional fastener bolt constructed according to the invention.

FIG. 6 shows a slightly different cushion construction. In this case the annular toroidal cushion is formed out of an elastomeric material that can deform by radial dislocation of the elastomer material. The cushion has a convex curved toroidal front surface 51 and a flat annualar rear surface 52 seated against the front surface of the bolt head.

Figure 10:
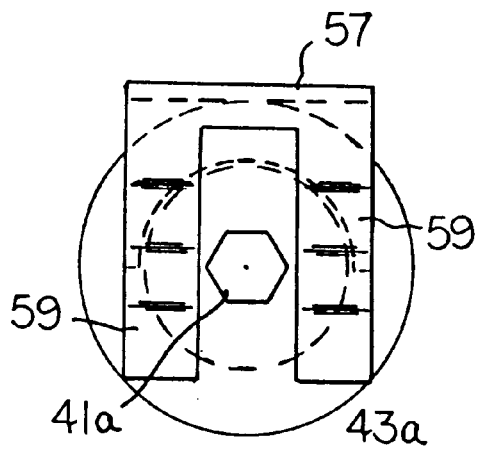
FIG. 10 is a front view of the fastener shown in FIG. 9.
Figure 9:
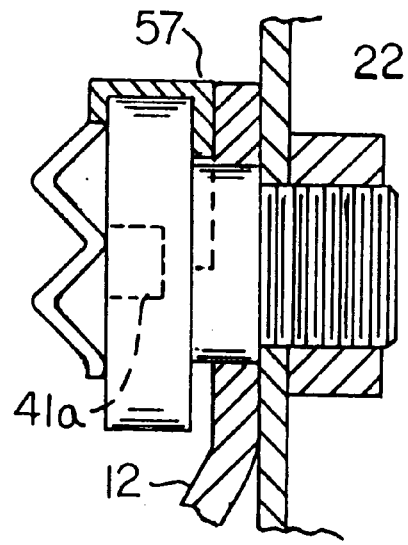
FIG. 9 is a view taken in the same direction as FIG. 1, but illustrating a further form that the invention can take.

FIGS. 9 and 10 show an additional embodiment of the invention. In this case, the cushion member is attached to the bolt with a retaining clip 57 that is basically similar to arm structure 37 used in FIG. 1, except that clip 57 does not have a retention hole of the type shown at 39 in FIG. 1. Clip 57 relies on the resiliency of the clip rear wall to exert a gripper force on the bolt head, whereby the clip-cushion unit is retained on the bolt.

The cushion comprises two accordion cross-sectioned walls 59 located on the front face of bolt head 20 to absorb impact energy. During an impact event walls 59 are resiliently deformed toward a flattened condition to absorb impact energy. Walls 59 are spaced apart to form a central access opening 43a aligned with a non-circular cavity 41a in the bolt head, whereby a turning implement can be extended through access opening 43a into cavity 41a to screw the fastener bolt into the concealed nut 22.

The cushioned fasteners depicted in the drawings are advantageous in that the resilient cushion can be a permanent part of the fastener bolt. The bolt can be screwed into the hidden (non-accessible) nut 22 without having to detach the cushion. Since the cushion is a permanent part of the bolt the installer does not have to remember to place the cushion on the bolt after the bolt-tightening operation; the cushion is already in place on the bolt.

The drawings show illustrative forms of the invention. However, it will be appreciated that the invention can be practiced in various forms and configurations.

What is claimed:

1. A seat belt anchorage comprising a flat belt-anchor element having a mounting hole, a fastener bolt having a head and a threaded shank extendable through said mounting hole to fasten said belt-anchor element to a mounting surface, said shank defining a bolt turning axis; and an energy-absorbing cushion carried on said head; said fastener head comprising a front surface, a flat annular rear surface, and an annular side surface connecting said front and rear surfaces;

said cushion comprising an annular resilient deformable member having a central opening centered on the bolt turning axis;

said bolt head having a non-circular cavity registering with said central opening for receiving a turning implement;

said annular resilient member comprising a resilient sheet having a convex curved toroidal front surface and a concave curved toroidal rear surface;

the front surface of said fastener head being spaced from the concave toroidal rear surface of said annular resilient member, whereby said annular resilient member provides an annular vacant space proximate to the front surface of the bolt head concentric with the bolt turning axis.

2. The seat belt anchorage of claim 1, and further comprising means for retaining said cushion on said head; said retaining means comprising an arm structure (37) extending from said cushion along the side surface of the fastener head and an annular flat wall extending from said arm structure along the annular rear surface of said fastener head; the shank of said bolt extending through said annular wall.

3. The seat belt anchorage of claim 1, and further comprising means for retaining said cushion on said head; said retaining means comprising an annular skirt extending alongside the annular side surface of said fastener head.

4. The seat belt anchorage of claim 1, and further comprising means for retaining said cushion on said head; said retaining means comprising a hollow non-circular mounting plug (47) fitting within the non-circular cavity in said fastener bolt.

* * * * *